Figure 1:
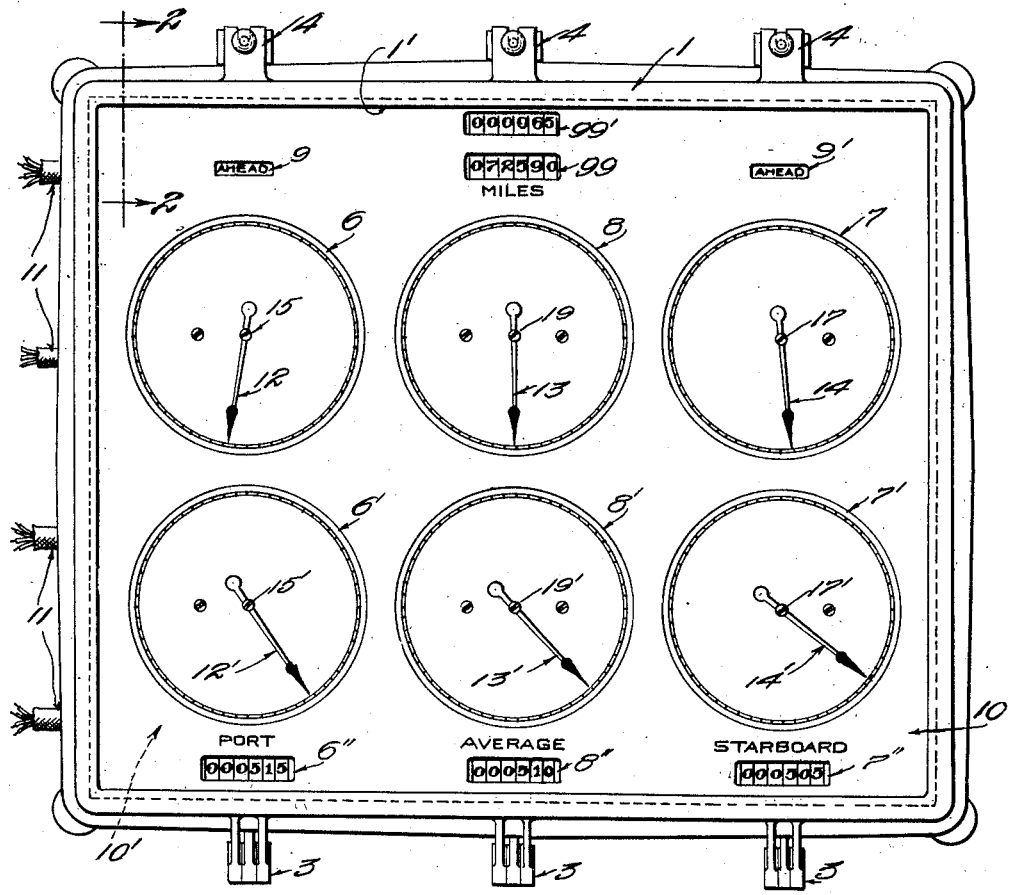

Aug. 16, 1927.

G. WALKER 1,638,973

DISTANCE MEASURING APPARATUS FOR SHIPS, ETC

Filed June 28, 1924     8 Sheets-Sheet 1

Inventor
George Walker
by his Attorneys
Roberts Roberts & Cushman

Aug. 16, 1927.
G. WALKER
1,638,973
DISTANCE MEASURING APPARATUS FOR SHIPS, ETC
Filed June 28, 1924
8 Sheets-Sheet 2
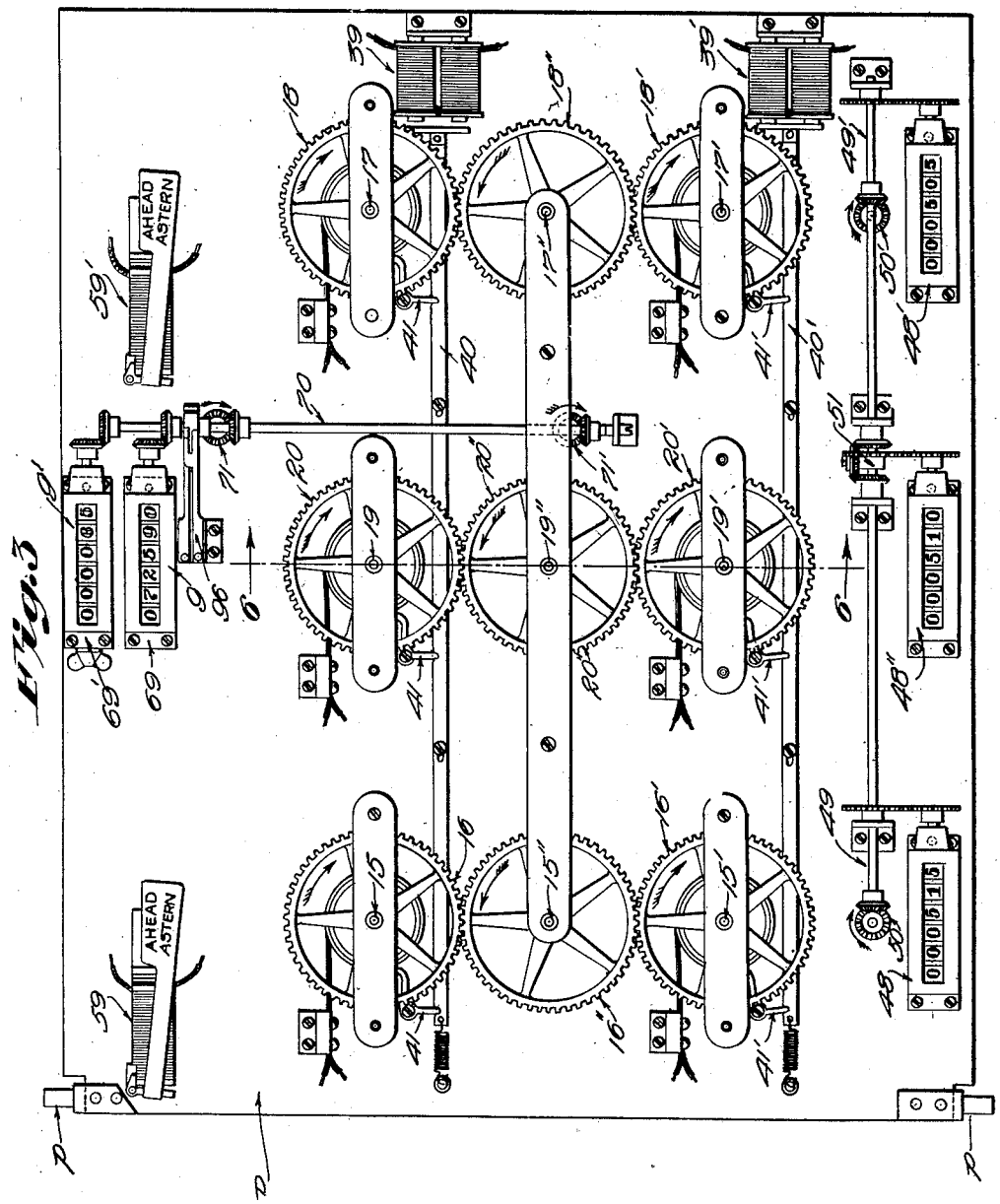
Inventor
George Walker
by his Attorneys
Roberts Roberts & Cushman

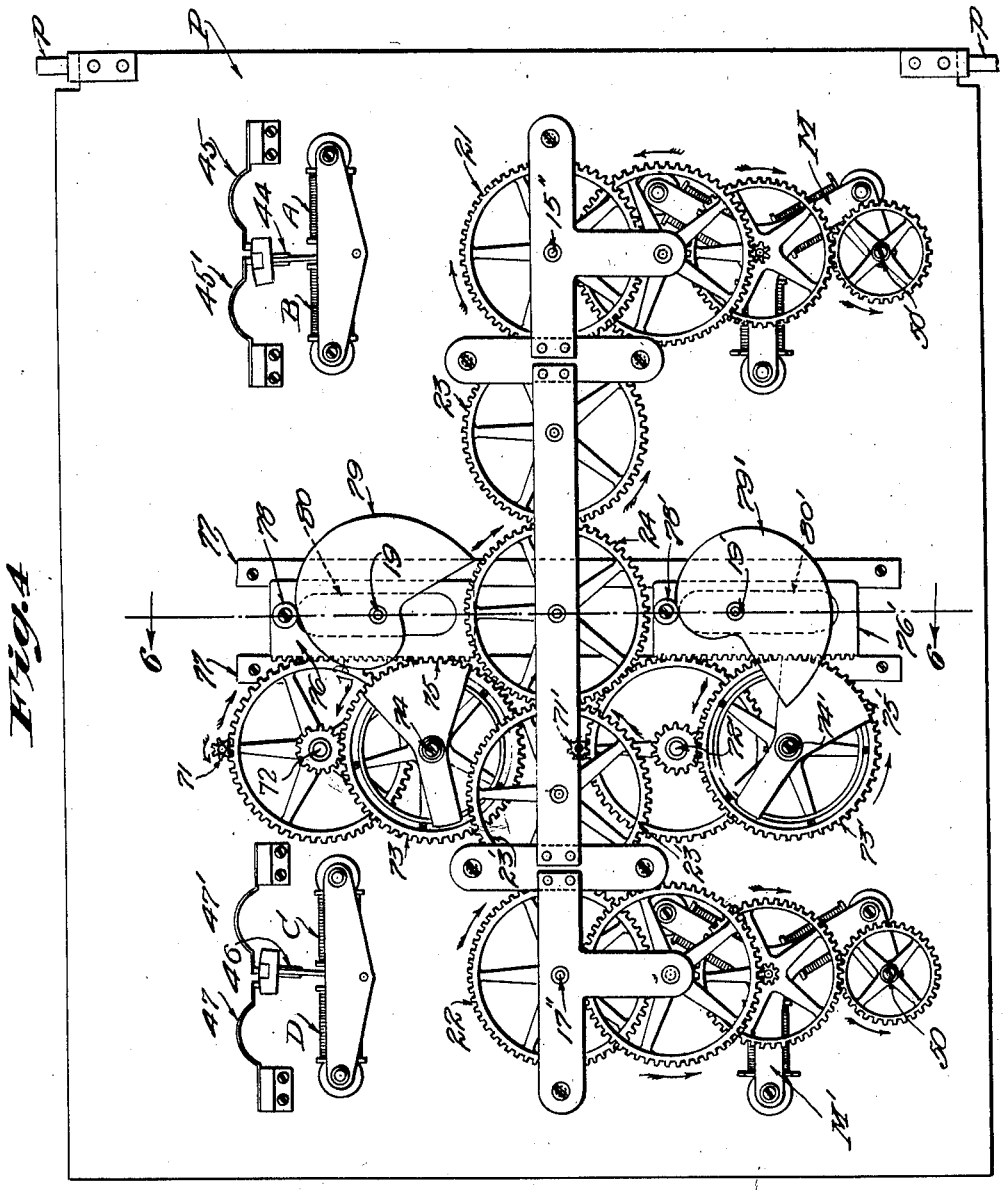

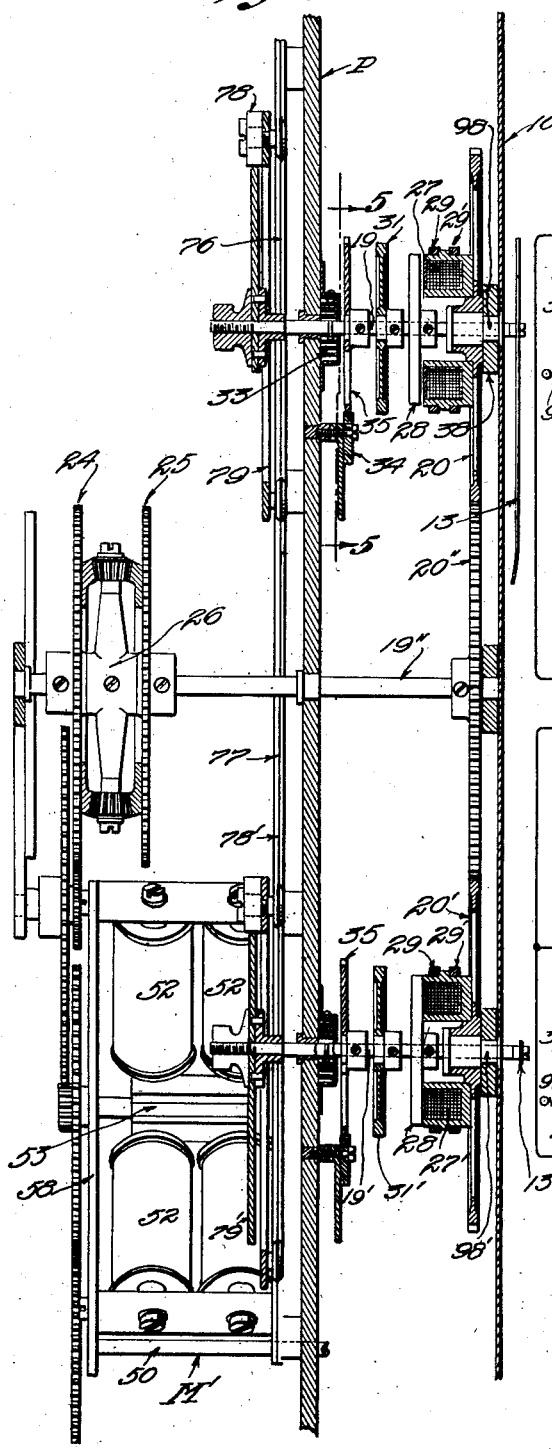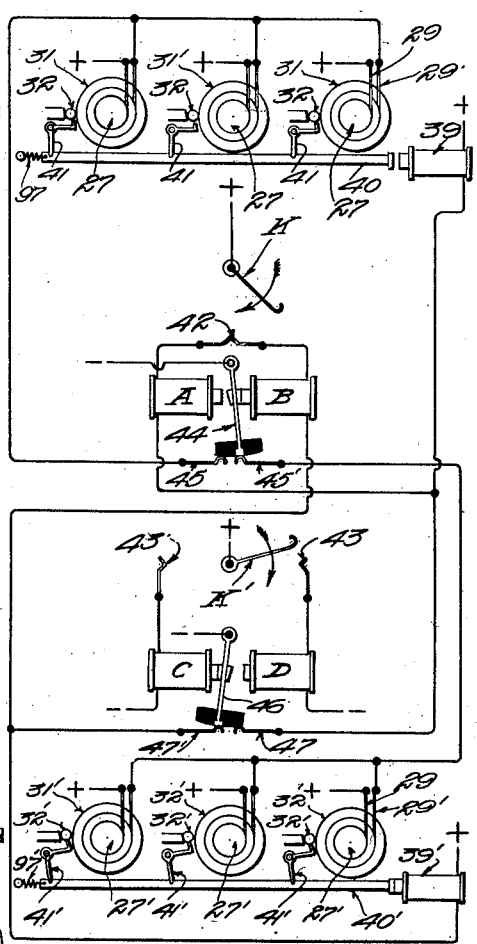

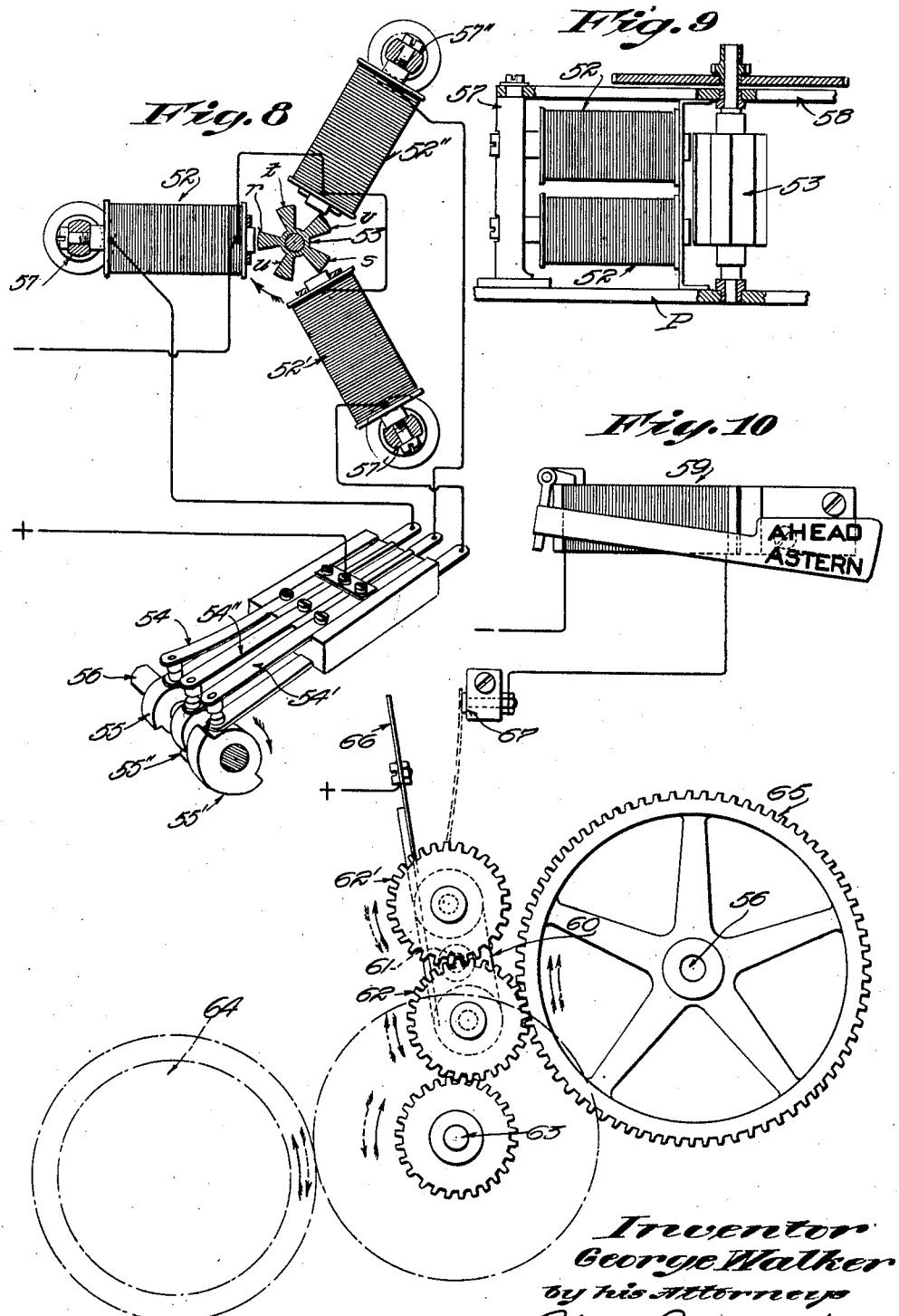

Aug. 16, 1927.

G. WALKER 1,638,973

DISTANCE MEASURING APPARATUS FOR SHIPS, ETC

Filed June 28, 1924

8 Sheets-Sheet 6

Inventor
George Walker
by his Attorneys
Roberts Roberts & Cushman

Aug. 16, 1927.
G. WALKER
DISTANCE MEASURING APPARATUS FOR SHIPS, ETC
Filed June 28, 1924  8 Sheets-Sheet 7
1,638,973
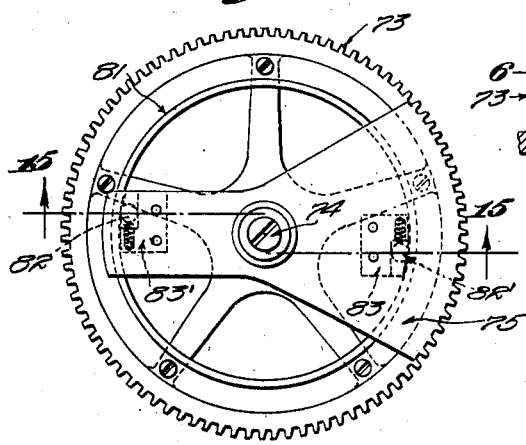
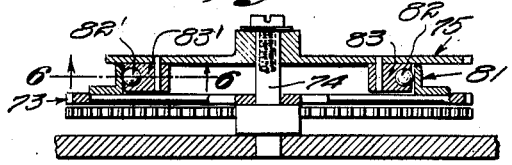
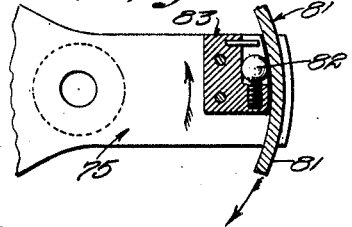
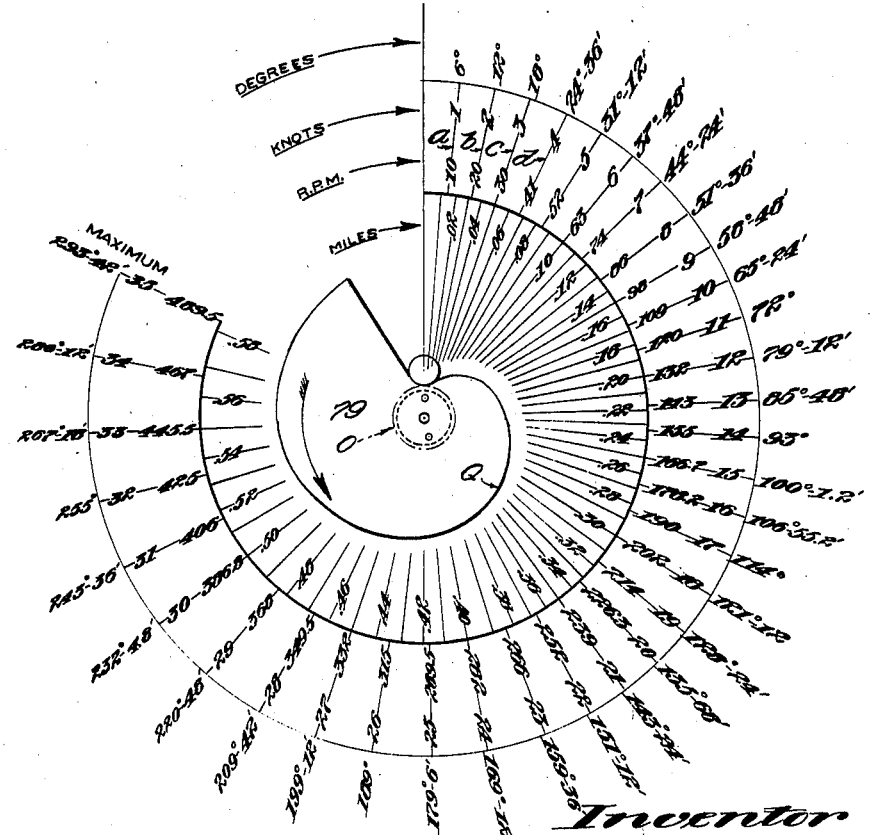

Aug. 16, 1927.
G. WALKER
1,638,973
DISTANCE MEASURING APPARATUS FOR SHIPS, ETC
Filed June 28, 1924
8 Sheets-Sheet 8
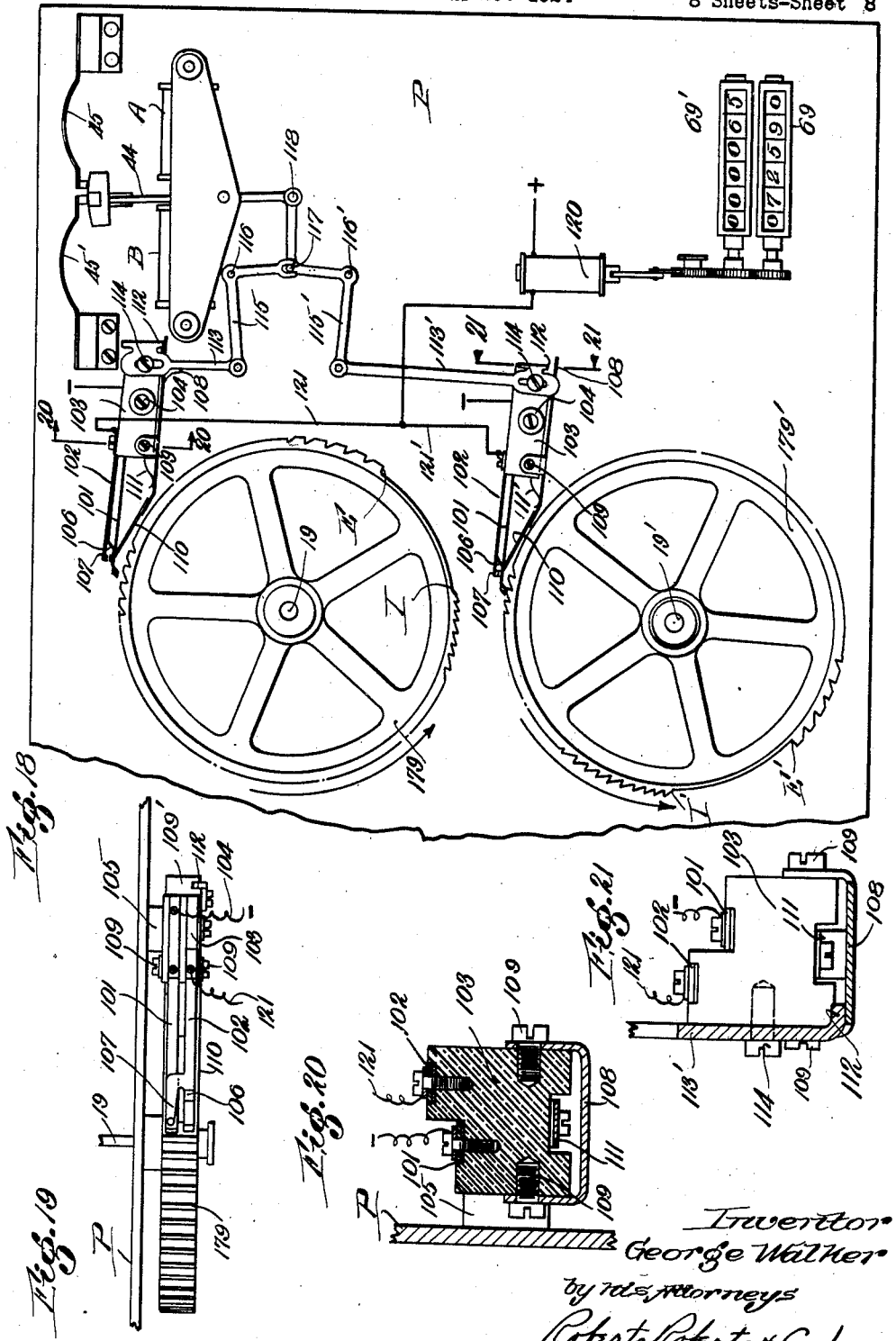

Patented Aug. 16, 1927.

1,638,973

UNITED STATES PATENT OFFICE.

GEORGE WALKER, OF NEWTON CENTER, MASSACHUSETTS.

DISTANCE-MEASURING APPARATUS FOR SHIPS, ETC.

Application filed June 28, 1924. Serial No. 722,942.

In the case of ships, aircraft and other bodies driven by a propeller (or propellers) moving in water, air or other fluid medium, the distance traveled is not directly proportional to the propeller speed, even when traveling in a still medium, the ratio between propeller speed and distance traveled varying more or less throughout the speed range of the ship depending upon various factors of the ship, propeller, and the fluid medium. A curve representing this varying ratio (propeller R. P. M. plotted against ship speed or distance traveled per unit of time) is known as a speed curve; and it departs somewhat from a straight line, each ship having a different curve.

Prior applications Ser. No. 273,744, filed January 29, 1919, Ser. No. 319,392, filed August 23, 1919, Ser. No. 614,838, filed Jan. 25, 1923 and Ser. No. 614,839, filed January 25, 1923, disclose apparatus for automatically and continually indicating the distance traveled in response to the propeller revolutions notwithstanding variations in said ratio at different speeds. In general the prior apparatus comprises two oscillatory controllers advancing during alternate minutes (or other periods of time) at rates proportional to the propeller speed, each controller being automatically reset to initial position while the other controller is advancing, in combination with associated contacts (electrical or mechanical) spaced in accordance with the said varying ratios, whereby the distance indicator is continually actuated by the controllers (acting alternately) to indicate the distance traveled whether at constant or varying speed. The invention claimed herein which is a species of the genus covered by said patents, is characterized by continuously acting controllers, such as cams, instead of controllers acting intermittently through spaced contacts, whereby the indicator is actuated continuously and with substantially perfect precision.

Figure 2:
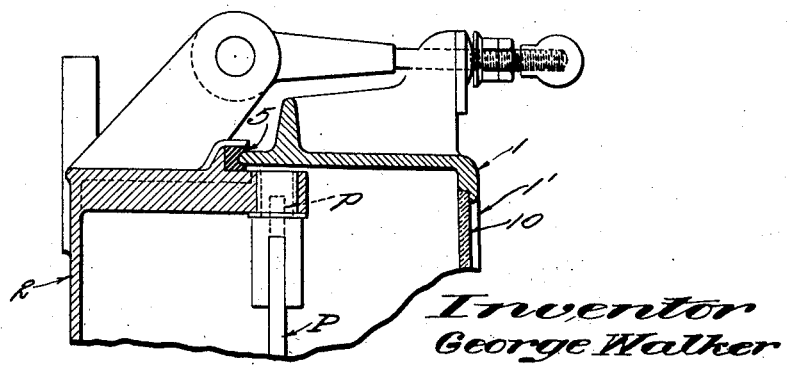
Figure 11:
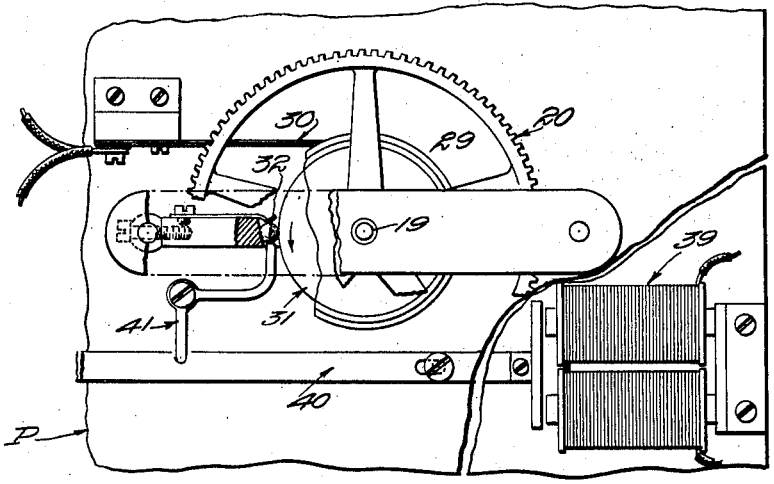
Figure 12:
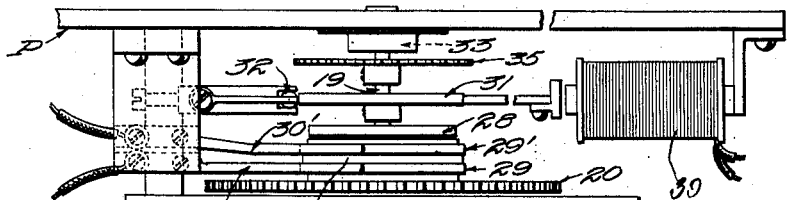
Figure 13:
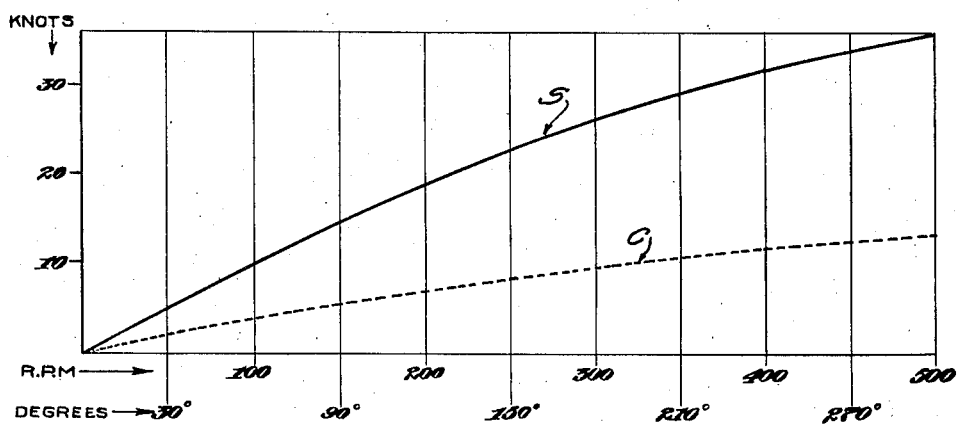

For the purpose of illustrating the invention one concrete embodiment is shown in the accompanying drawings, in which, Fig. 1 is a front view of the encased apparatus; Fig. 2 is a detail section of the case on line 2—2 of Fig. 1; Fig. 3 is a front view of the interior panel carrying the mechanism; Fig. 4 is a rear view of the panel; Fig. 5 is a detail view of the escapement, viewed from line 5—5 of Fig. 6; Fig. 6 is an enlarged vertical central section on line 6—6 of Figs. 3 and 4; Fig. 7 is a diagram of the main circuits; Fig. 8 is a view, partly diagrammatic and partly perspective of the circuit closer associated with the propeller shaft and the synchronous motor controlled thereby; Fig. 9 is a side view of a part of the synchronous motor; Fig. 10 is a detail view of the mechanism for indicating whether the propeller is driving ahead or astern; Fig. 11 is an enlarged detail view of the machanism for controlling one of the revolution counters, viewed from the same aspect as Fig. 3; Fig. 12 is a top view of the mechanism shown in Fig. 11; Fig. 13 is a diagram representing the "speed curve" of a particular ship and also the shape of the aforesaid control cams; Fig. 14 is an enlarged detail view of a part shown from the same aspect in Fig. 4; Fig. 15 is a section on line 15—15 of Fig. 14; Fig. 16 is a section on the line 16—16 of Fig. 15; Fig. 17 is a diagram showing the plan of the control cams; Fig. 18 is a view similar to Fig. 4 showing a modification; Fig. 19 is a top view of a part of Fig. 18; Fig. 20 is a section on line 20—20 of Fig. 18; and Fig. 21 is a section on line 21—21 of Fig. 18.

The casing shown in Figs. 1 and 2 comprises a front 1 and back 2 having integral side walls hinged together at the bottom by hinges 3 and held together at the top by fasteners 4, a rubber gasket 5 sealing the joint between the front and back. The opening 1' in the front is closed by a rectangular glass panel 10 which is sealed inside the front around its margin. Inside front glass 10 is a thin sheet metal plate 10' (Fig. 6) having engraved thereon circular scales 6 and 6' for the port revolution counters, scales 7 and 7' for the starboard revolution counters and scales 8 and 8' for the average revolution counters, and having therein windows 6", 7" and 8" for port, starboard and average totalizing counters, windows 9 and 9' for the ahead or astern indicators of the port and starboard propellers respectively, and windows 99 and 99' for the total and trip distances respectively. Electrical conductors lead from the casing through sealed outlets 11. The operating mechanism is mounted on interior panel P which is supported upon back 2 by pivots $p$ (Figs. 2, 3, and 4) which enables it to swing horizontally when the front is swung downwardly 90° or more.

The upper set of counters 12, 13 and 14 and the lower set of counters 12', 13' and 14' advance clockwise during alternate minutes, 12 and 12' alternately counting the revolutions of the port propeller, 14 and 14' the starboard propeller, and 13 and 13' alternately counting the average of the two. While one set is advancing the other set is held in advanced position, thus displaying the R. P. M. during the preceding minute. Just before the advancing set stops the advanced set is automatically reset in counterclockwise direction to initial upright position. As shown in Fig. 3 the port indicator shafts 15 and 15' are interconnected by gears 16, 16' and 16'', the starboard indicator shafts 17 and 17' by gears 18, 18' and 18'', and the average indicator shafts 19 and 19' by gears 20, 20' and 20''. The shafts 15'' and 17'' are constantly driven at speeds proportional to the port and starboard propellers respectively through trains of gears leading to synchronous motors M and M', which are each constructed as shown in Fig. 8 and controlled by circuit closers associated with the propeller shafts, whereby the port and starboard indicator gears 16 and 16' and 18—18' are constantly driven at speeds proportional to the port and starboard propellers respectively. The shafts 15'' and 17'' (Figs. 3 and 4) also carry gears 21 and 22 (Fig. 4) which are respectively connected, through gears 23 and 23', with the two gears 24 and 24 (Figs. 4 and 6) of a differential whose follower 26 is fast to the shaft 19'', whereby the gears 20—20'—20'' are constantly driven at a speed proportional to the average of the port and starboard propeller speeds. Thus gears 16—16' and 18—18'' constantly rotate at speeds proportional to the port and starboard propellers respectively while the gears 20 and 20' constantly rotate at a speed proportional to the average of the propeller speeds.

Each of the gears 16, 16', 18, 18', 20 and 20' is intermittently connected to its corresponding indicator 12, 12', 13, 13', 14 or 14', disconnected and reset by similar mechanism, one of which will now be described in connection with gear 20 and indicator 13 (Fig. 6). Gear 20 rotates around shaft 19 on fixed stud 98 independently of shaft 19 and carries a circular magnet 27 whose disk armature 28 is fast to the shaft 19. When the magnet is energized through its slip rings 29—29' and brushes 30—30' (Figs. 11 and 12) the armature is pulled into frictional engagement with the magnet, thus causing the shaft to rotate with the gear. The shaft 19 also carries a disk 31 which cooperates with a ball clutch 32 (Figs. 11 and 12) to hold the shaft 19 in advanced position when the magnet 27 is deenergized. A coil spring 33 returns the shaft to initial position when the ball clutch is moved out of holding position. Escapement mechanism 34 slows the return movement of shaft 19 to initial position. As shown in Fig. 5 the escapement mechanism comprises a notched wheel 35, an escape lever 36, and a spring pressed pawl 37 on the wheel to stop the return movement at initial position. The shaft 19 is journaled in panel P and in stud 98 mounted in cross-bar 38 on the front of the panel.

The ball clutches 32 of the upper set of indicators 12—13—14 are simultaneously moved out of holding position, to reset the indicators, by magnet 39 acting through bar 40 upon the bell-cranks 41 (Figs. 3, 11 and 12) and the ball clutches of the lower set of indicators 12'—13'—14' are likewise actuated simultaneously by similar mechanism similarly designated in Fig. 3.

Suitable electrical control for the magnets 27 and 39 is shown in Fig. 7 wherein certain of the parts already described are indicated diagrammatically and correspondingly designated. A, B, C and D represent the magnets shown in Fig. 4 and K and K' represent clock switches which are preferably located outside the casing 1—2 and are controlled by any suitable clock mechanism. Switch K engages contact 42 on each minute while switch K' engages contacts 43 and 43' respectively just before the end of alternate minutes. With the parts in the position shown lower magnets 27' are energized through switch 45', thus causing the lower indicators 12'—13'—14' to be advancing, the upper set of indicators being held by balls 32 in the positions to which they were advanced during the preceding minute. Just before the expiration of the current minute switch K' engages contact 43 to energize magnet D and throw armature 46 to the right which (1) energizes magnet 39 through switch 47 to release balls 32 to reset the upper indicators 12—13—14, (2) opens the circuit of magnet 39' at 47' to permit spring 97' to retract bell-cranks 41', thereby permitting balls 32' to return to operative position, and (3) conditions the circuit of magnet A. At the expiration of the minute switch K engages contact 42 to energize magnet A and throw armature 44 to the left which (1) closes circuit to magnets 27 through switch 45 to start the upper indicators 12—13—14 and (2) opens the circuit of magnets 27' simultaneously to stop the lower indicators 12'—13'—14'. Near the end of the next minute switch K' engages contact 43' to energize magnet C and throw armature 46 to the left which (1) energizes magnet 39' through switch 47' to release balls 32' to reset the lower indicators, (2) opens the circuit of magnet 39 at 47 to permit spring 97 to retract the bell-cranks 41, thereby permitting balls 32 to return to operative position, and (3) conditions the circuit of magnet B. At the end of the minute switch K again engages contact 42 to energize magnet B and throw armature 44 to the right which (1) closes circuit to magnets 27' through switch 45' to start the lower indicators and (2) opens the circuit of magnets 27 simultaneously to stop the upper indicators. Thus the upper and lower indicators are alternately advanced, and then held advanced and reset during alternate intervals of time.

The revolution counters 48 and 48' (Fig. 3) which show through windows 6" and 7" (Fig. 1) are constantly geared to synchronous motors M and M' respectively through shafts 49—50 and 49'—50' (Figs. 3 and 4) and therefore count the total revolutions of the port and starboard propellers respectively. Counter 48" is connected to shafts 49 and 49' through differential 51 and therefore totalizes the average revolutions of the two propellers.

The synchronous motors M and M' are preferably constructed and controlled as shown in Fig. 8. Each motor has three magnets 52—52'—52" spaced 120° apart and an armature 53 having five poles. The magnets are connected to circuit closers 54—54'—54" controlled by cams 55—55'—55" on shaft 56 connected to the propeller. The cams are positioned to energize the magnets in the order named and the cams are sufficiently long to overlap thereby to energize the next succeeding magnet before the preceding magnet is deenergized. Thus in Fig. 8 switch 54 is closed by cam 55 to energize magnet 52 thereby holding pole $r$ opposite 52. Before switch 54 is opened cam 55' will close switch 54' to energize magnet 52' thereby advancing the armature 12°. Since magnet 52 is still energized the armature is restrained from being carried by its momentum beyond the 12° step since the magnet 52 which acts as a brake exerts an attraction upon the pole $r$ which balances that of the magnet 52' upon the pole $s$. As shaft 56 continues to rotate switch 54 is opened to deenergize magnet 52, thereby permitting the armature to advance another 12° step until pole $s$ is opposite magnet 52'. After two more steps pole $t$ is opposite magnet 52"; after two more steps pole $u$ is opposite magnet 52; after two more steps pole $v$ is opposite magnet 52'; etc., the magnets being energized successively and in overlapping time relationship. Thus the motors M and M' advance in exact synchronism with the propeller shafts. As shown in Figs. 4, 6 and 9 the synchronous motors are mounted on the back of panel P by three posts 57—57'—57" which are interconnected by a Y-shaped yoke 58, the armature 53 being journaled in the yoke and panel.

The magnets 59 and 59' (Fig. 3) which control the signals showing through windows 9 and 9' (Fig. 1) are controlled by mechanism associated with the propeller shafts as shown in Fig. 10 wherein 60 is an arm pivoted at 61, 62 and 62' are gears pivotally mounted on the opposite ends of arm 60, 63 a shaft connecting gear 62 with the propeller shaft 64, 65 a gear for driving shaft 56 (Fig. 8) and adapted to mesh with either 62 or 62', and 66 a switch adapted to close the circuit of magnet 59 by contacting with contact 67. When the propeller is driving forward the parts are in the position shown in Fig. 10, permitting Ahead to show through window 9 (or 9'). When the propeller is reversed arm 60 swings clockwise closing switch 66—67 and displaying Astern. Gear 65 is always driven in the same direction, by gear 62 when going ahead and by gear 63' when going astern.

The distance indicators 69 and 69' (Fig. 3) which show through windows 99 and 99' (Fig. 1) are geared to shaft 70 which is geared to shafts 71 and 71' extending through panel P. At the back of the panel (Fig. 4) shafts 71 and 71' are geared to shafts 72 and 72' which carry gears meshing with gears 73 and 73' loosely mounted on shafts 74 and 74'. Fast to shafts 74 and 74' are gear segments 75 and 75' meshing with racks 76 and 76' vertically slidable in guides 77. Racks 76 and 76' carry cam followers 78 and 78' resting on cams 79 and 79' which are mounted on the aforesaid alternately-advancing average-speed shafts 19 and 19' (Figs. 1, 3, 4 and 6), the shafts 19 and 19' extending through slots 80 and 80' in the racks. As shown in Figs. 14, 15 and 16 a ring 81 is fast to gear 73 and two ball clutches 82 and 82' are mounted in blocks 83 and 83' fast to segment 75 so that counter-clockwise rotation of the segments rotate the gears 73 counter-clockwise (Fig. 14) while the segments may rotate clockwise independently of the gears. Thus during alternate minutes cams 79—79' alternately advance the distance indicators 69—69' through cam followers 78—78', racks 76—76', gear segments 75—75' ball clutches 82—82', gears 73—73', shafts 72—72', shafts 71—71' and shaft 70. Thus shaft 70 is rotated continuously, first by cam 79 and then by cam 79', each cam being reset to initial position while the other cam is advancing.

Each cam 79 is shaped according to the speed curve of the particular ship upon which the apparatus is to be used. In Fig. 13 S represents the speed curve of a particular ship, where the abscissæ are propeller R. P. M. and the ordinates knots, and C represents the curvature of the cams 79 and 79', where cam rise is plotted as ordinates against degrees of rotation of the cams as abscissæ, the ordinates of the two curves being proportional and the proportion depending upon the gear ratio between the racks 76—76' and the distance indicators. In Fig. 17 the outer row of numbers indicates degrees around the axis of the cam from initial position, the next row indicates the knots recorded by the distance indicator when the cam rotates different degrees, the next row the propeller R. P. M. required to rotate the cam to different degrees, and the inner row indicates the hundredths of a mile traveled by the ship during each advance of the cam which is the distance traveled per minute. The relation between the propeller R. P. M. and the knots (i. e. the speed curve) is determined by testing the ship in the usual way. The cam is then developed in accordance with this relation by angularly dividing the cam into R. P. M. divisions (a, b, c, d, etc., Fig. 17) bearing a fixed ratio to the degree divisions (5 R. P. M. to 3° in example—120:72, 155:93, 190:114, 315:189, 425:255, etc.) and then giving the cam sufficient rise between divisions to actuate the distance indicator the proper amount according to the speed curve, the rise of the cam being the increase in radius from circle O to periphery Q between divisions. Thus, in the example chosen, since 10 R. P. M. will drive the ship 1 knot, the rise of the cam in division a is designed to actuate the distance indicator 0.0167 mile during the minute the cam is advancing through division a (0.0167 mile per minute corresponding to 1 knot); since 20 R. P. M. will drive the ship 2 knots the rise in division b is made such that this rise plus the rise in division a will advance the distance indicator 0.033 mile; etc. Thus the distance indicator is advanced the proper distance during each minute irrespective of the speed of the ship and irrespective of changes in the speed of the ship.

Any mechanism which is to be driven at a speed proportional to the speed of the ship may be connected to shaft 70, either mechanically or electrically. For example, in my companion application No. 722,943 filed on even date herewith the compass record sheet may be driven by a magnet recurrently energized by circuit closer 96 (Fig. 3) associated with shaft 70.

Instead of cams 79 and 79' other controllers may be employed. For example, the controllers may be in the form of notched wheels or wheels having spaced electrical contacts moving past a stationary contact or the spaced electrical contacts may be stationary and the single contact movable along the spaced contacts successively to close the circuits leading thereto. In such cases the teeth of the notched wheels or the electrical contacts are so spaced that the distance indicator is advanced the proper distance for each advance of the controllers during each minute. Referring to Fig. 17 for example, if each controller advances 18° each minute when traveling 3 knots the number of teeth or contacts in the first 18° of each controller is such as to actuate the distance indicator 0.05 mile each minute; and if when traveling 6 knots the controllers advance 37° 48' each minute the number of teeth throughout the arc 37° 48'—18° is such as to actuate the distance indicator another 0.05 mile; etc. In brief the teeth or contacts are spaced in accordance with the speed curve of the particular ship.

Figs. 18 to 21 illustrate one way of using notched wheels, such as mentioned in the preceding paragraph, for controlling the distance indicators 69 and 69' (Fig. 18) which correspond to 69 and 69' in Fig. 1. These notched wheels 179 and 179' have series of teeth beginning at I and I' respectively and ending at E and E' respectively, the spacing of the teeth varying throughout the series in accordance with the speed curve of the ship. The notched wheels 179 and 179' are mounted on shafts 19 and 19' in place of cams 79 and 79' and the mechanism controlled by cams 79 and 79' in Figs. 1 to 17 is replaced by the mechanism now to be described.

Referring to Figs. 18 to 21 the parts P, A, B, 44, 45, and 45' correspond to the parts similarly designated in Figs. 4 and 7. Associated with each of the notched wheels 179—179' is a circuit closer comprising two spring contacts 101 and 102 mounted on an insulation block 103 fast to panel P by screw 104 and spacer 105. The spring 102 is mounted at a higher level than spring 101 and its free end is bent down at 106 to the same level. Spring 102 has an arm 107 extending over the spring 101 and the superposed parts have circuit closing contacts normally open. A lifter 108 is pivotally mounted beneath each block 103 by screws 109 and has an upwardly inclined end 110 extending into juxtaposition to the under sides of the free ends of contact springs 101 and 102, whereby when the lifter is swung in a clockwise direction (Fig. 18) the free ends of the contact springs are lifted clear of the notched wheel 179 or 179' and the circuit is held open. Each lifter 109 is normally held out of lifting position by a spring 111 and is moved into lifting position by a finger 112 on arm 113 or 113' guided for vertical movement by screws 114 extending through slots in the arms. The arms 113 and 113' are connected to bell-cranks 115 and 115' which are pivoted to panel P at 116 and 116', the other ends of the bell-cranks being connected through pin-and-slot connection 117 to one end of the bell-crank armature 44 which is pivoted at 118.

In the position of the parts shown in Fig. 18 magnet B is energized, thereby lifting the upper set of contacts 101—102 out of contact with wheel 179 and permitting the lower set of contacts 101—102 to engage the teeth of wheel 179'. As a tooth of wheel 179' moves under the ends of contacts 101—102 the contact 101 is first raised into engagement with contact 102 and then the two contacts are further lifted together. Spring 101 is slightly longer than spring 102 so that spring 102 is released by each tooth of the wheel slightly before spring 101, thereby permitting spring 102 to snap down first and abruptly open the circuit. Thus the circuit is closed once for each contact of the wheel, thereby advancing the distance indicators one step by means of ratchet magnet 120 which is connected in parallel with the two switches 101—102 through conductors 121 and 121'. As above explained magnets A and B are energized at the ends of alternate minutes alternately to lift the two sets of contacts 101—102 so that magnet E is alternately operated by the upper and lower wheels 179 and 179'. As shown in Fig. 18 the upper wheel is being held in advanced position, with its contacts lifted, while the lower wheel is advancing and recurrently closing its switch 101—102. Near the end of the current minute wheel 179 will be sent to initial position (with the beginning of the series of teeth, indicated at I, beneath the contacts 101—102) and at the end of the current minute the following occurs: (1) the lower wheel 179' stops and the upper wheel starts and (2) at the same instant the lower set of contacts 101—102 is lifted from wheel 179' and the upper set of contacts 101—102 is moved into engagement with wheel 179'; the mechanism for starting and stopping and resetting shafts 19 and 19' being the same as above described in connection with Figs. 1 to 17.

I claim:

1. Apparatus for measuring the distance traveled by a body driven by a propeller moving in a fluid medium comprising an indicator, and cam mechanism controlled by the speed of the propeller to advance said indicator in proportion to the distance traveled whether at constant or varying speed.

2. Apparatus for measuring the distance traveled by a body driven by a propeller moving in a fluid medium comprising an indicator, and cam mechanism controlled by the speed of the propeller to advance said indicator in proportion to the distance traveled whether at constant or varying speed, the advance of said cam corresponding to the speed of the propeller and the rise of said cam corresponding to the speed curve of the body.

3. Apparatus for measuring the distance traveled by a body driven by a propeller moving in a fluid medium, comprising an actuator moving proportionately to the propeller motion, a distance indicator, and alternate mechanism for actuating said indicator in response to said actuator during alternate periods of time, said mechanism including means for actuating said indicator continuously during said periods.

4. Apparatus for measuring the distance traveled by a body driven by a propeller moving in a fluid medium, comprising an actuator moving proportionately to the propeller motion, a distance indicator, and alternate mechanism for actuating said indicator in response to said actuator during alternate periods of time, said mechanism including cams shaped in accordance with the speed curve of the body.

5. Apparatus for measuring the distance traveled by a body driven by a propeller moving in a fluid medium, comprising an actuator moving proportionately to the propeller motion, a distance indicator, and alternate mechanism for actuating said indicator in response to said actuator during alternate periods of time, said mechanism including cams respectively advancing from the same initial positions during said alternate periods, the advance of the cams corresponding to the speed of the propeller and the rise of the cams corresponding to the speed curve of the body.

6. Apparatus for measuring the distance traveled by a body driven by a propeller moving in a fluid medium, comprising a distance indicator, and two controllers movable proportionately to the propeller motion during alternate periods of time for continuously actuating said indicator during said periods respectively, said controllers being adjusted to the varying ratio between propeller speed and distance traveled at different speeds.

7. Apparatus for measuring the distance traveled by a body driven by a propeller moving in a fluid medium, comprising a distance indicator and two cams movable proportionately to the propeller motion from the same initial positions during alternate periods of time for actuating said indicator during said periods respectively, said cams being shaped in accordance with the varying ratio between propeller speed and distance traveled at different speeds.

8. Apparatus for measuring the distance traveled by a body driven by a propeller moving in a fluid medium, comprising a distance indicator, two cams movable from the same initial positions during alternate periods of time for actuating said indicator during said periods respectively, said cams having a rise corresponding to the speed curve of the body, and means for advancing the cams proportionately to the propeller motion during said periods.

9. Apparatus for measuring the distance traveled by a body driven by a propeller moving in a fluid medium, comprising an actuator moving proportionately to the propeller motion, a distance indicator, and two sets of mechanical connections alternately operated by said actuator for continuously actuating said indicator during alternate periods of time respectively.

10. Apparatus for measuring the distance traveled by a body driven by a propeller moving in a fluid medium, comprising an actuator moving proportionately to the propeller motion, a distance indicator, and two cams alternately operated by said actuator for continuously actuating said indicator during alternate periods of time respectively.

11. Apparatus for measuring the distance traveled by a body driven by a propeller moving in a fluid medium, comprising an actuator moving proportionately to the propeller motion, a distance indicator, and two cams alternately operated by said actuator for continuously actuating said indicator during alternate periods of time respectively, each advance of said cams corresponding to the speed of the propeller and the rise of the cams corresponding to the speed curve of the body.

12. Apparatus for measuring the distance traveled by a body driven by a propeller moving in a fluid medium, comprising a distance indicator, cams movable proportionately to the propeller motion, and means operated by said cams for continuously controlling said indicator, said cams being shaped to compensate for the varying ratio between propeller speed and distance traveled at different speeds.

13. Apparatus for measuring the distance traveled by a body driven by a propeller moving in a fluid medium, comprising means movable cyclically in proportion to the propeller motion, and means movable cyclically in response to the first means, each cyclic movement of the latter means being continuous and corresponding in length to the current speed of the body during the period of the cycle.

14. Apparatus for measuring the distance traveled by a body driven by a propeller moving in a fluid medium, comprising means movable cyclically in proportion to the propeller motion, and means movable cyclically in response to the first means, each cyclic movement of the latter means being continuous and varying throughout its duration proportionately to the variations in ratio between propeller speed and distance traveled up to the current speed of the propeller.

15. Apparatus for measuring the distance traveled by a body driven by a propeller moving in a fluid medium comprising oscillatory means advancing in proportion to the propeller motion during equal recurrent periods of time, and means movable under the control of said means for indicating the distance traveled, the operative relation between said means being correlated with the speed curve of the body continuously to move the indicating means during each period at a rate varying proportionately to the variations in ratio between propeller speed and distance traveled up to the current speed of the propeller for each period.

16. Apparatus for measuring the distance traveled by a body driven by a propeller moving in a fluid medium, comprising oscillatory controllers advancing in proportion to the propeller motion during alternate periods of time, and an indicator movable in response to said controllers alternately for indicating the distance traveled, the controllers being correlated with the speed curve of the body continuously to move the indicator during each period at a rate varying proportionately to that portion of the curve below the point corresponding to the speed of the propeller during the period.

Signed by me at Boston, Massachusetts, this third day of June, 1924.

GEORGE WALKER.